(12) United States Patent
Komiya et al.

(10) Patent No.: US 6,318,063 B1
(45) Date of Patent: Nov. 20, 2001

(54) CABLE DRAG CHAIN

(75) Inventors: Shoichiro Komiya; Takayuki Matsuda, both of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/692,367

(22) Filed: Oct. 19, 2000

(30) Foreign Application Priority Data

Oct. 19, 1999 (JP) .................................. 11-296998

(51) Int. Cl.[7] .................................. F16G 13/00
(52) U.S. Cl. .................................. 59/78.1; 59/600; 248/49
(58) Field of Search .................. 59/78.1; 248/49

(56) References Cited

U.S. PATENT DOCUMENTS

| | | | |
|---|---|---|---|
| 3,473,769 | * 10/1969 | James | 59/78.1 |
| 4,769,985 | * 9/1988 | Moritz | 59/78.1 |
| 4,953,735 | * 9/1990 | Tisbo et al. | 220/6 |
| 5,890,357 | * 4/1999 | Blase | 59/78.1 |
| 5,996,330 | * 12/1999 | Ehmann et al. | 59/78.1 |
| 6,161,373 | * 1/2001 | Heidrich et al. | 59/78.1 |
| 6,167,689 | * 1/2001 | Heidrich et al. | 59/78.1 |

FOREIGN PATENT DOCUMENTS

| | | |
|---|---|---|
| 3714056 | 8/1988 | (DE) . |
| 3-52774 | 11/1991 | (JP) . |
| 10028310 | 1/1998 | (JP) . |

* cited by examiner

*Primary Examiner*—David Jones
(74) *Attorney, Agent, or Firm*—Dann, Dorfman, Herrell and Skillman; Henry H. Skillman

(57) ABSTRACT

A cable drag chain includes a plurality of link members connected together end to end in a bendable manner. Each of the link members is molded of synthetic resin and includes a pair of opposed left and right side plates, and upper and lower connecting plates connecting upper and lower edges, respectively, of the left and right side plates. The upper connecting plate has one end made contiguous to one of the side plates via a resiliently deformable hinge portion, the other end of the upper connecting plate being formed with a locking portion releasably engaged with a portion of the other side plate. The hinge portion has a circular recess formed in a central portion of an outside surface thereof and hence is reduced in cross-sectional area at the recessed central portion, so that the upper connecting plate has a tendency to resiliently flex at the recessed central portion in a given direction when the upper connecting plate is forced to move from an erected released position to a recumbent assembled position. The width and thickness of the hinge portion are determined in view of a maximum tensile stress and a maximum compressive stress of a synthetic resin material to such an extent that the hinge portion is deformable in an elastic region.

7 Claims, 5 Drawing Sheets

CABLE DRAG CHAIN

BACKGROUND OF THE INVENTION

1. Field of the Invention

The present invention relates to a cable drag chain for protecting and guiding safely and surely such flexible members as cable and hose which feed energy to a movable machine. More particularly, this invention relates to an improvement in a link member of the cable drag chain which is composed of a pair of left and right side plates and upper and lower connecting plates connecting upper and lower edges, respectively, of the side plates.

2. Description of the Related Art

Cable drag chains include a plurality of link members connected end to end in a bendable manner. The cable drag chain is connected at one end to a movable machine and at the other end to a fixed frame or a floor surface. Each of the link members has a hollow internal space so that a flexible member such as cable or hose is received in the interior of a continuous hollow internal spaces of the consecutive link members.

One example of such cable drag chains is disclosed in Japanese Utility Model Publication No. HEI-03-52774. In the disclosed cable drag chain, each link member includes a pair of opposed left and right side plates, a lower connecting plate connecting lower edges of the left and right side plates, and an upper connecting plate connecting upper edges of the left and right side plates. The upper connecting plate is hinged to the side plates so that a flexible member can be received in the cable drag chain.

Each of the side plates has an engagement pin provided at a central portion of the upper edge thereof, and the upper connecting plate has a pair of hooks formed at opposite end thereof and adapted to be snap-fit with the respective engagement pins of the side plates. For attaching the upper connecting plate to the side plates, the hook at one end of the upper connecting plates is snap-fit with the engagement pin of one side plate and, subsequently, the upper connecting plate is turned about one end hooked on the engagement pin such that the hook at the opposite end of the upper connecting plate is brought into snap-fitting engagement with the engagement pin of the other side plate.

Another cable drag chain having a different structure is disclosed in Japanese Patent Laid-open Publication No. HEI10-28310 In the disclosed cable drag chain, each link member is comprised of a pair of opposed left and right side plates and upper and lower connecting plates connecting upper and lower edges, respectively, of the side plates. The upper connecting plate is formed integrally with one of the side plates and connected to the one side plate via a hinge portion.

The hinge portion takes the form of recessed portion formed at a junction between the one side plate and the upper connecting plate. For assembling the link member, the upper connecting plate is bent or folded about the recessed hinge portion through an angle of about 90 degrees and, subsequently, a hook formed at a distal end of the upper connecting plate is hooked on the other side plate.

The cable drag chain shown in Japanese Utility Model Publication No. HEI-03-52774 has various problems due to the upper connecting plate formed separately from the side plates, as enumerated below.

(1) The upper connecting plate which is snap-fit at opposite ends with the left and right side plates is likely to be detached from the side plates when the cable drag chain is twisted or otherwise deformed, thus failing to achieve an essential function to receive and protect a flexible member such as cable or hose.

(2) Due to the snap-fit engagement between the opposite ends of the upper connecting plate and the left and right side plates, when one end of the upper connecting plate is detached from one side plate for the maintenance or inspection of the flexible member, the other end of the upper connecting plate is apt to disengage from the other side plate. This may result in a missing upper connecting plate.

(3) The snap-fit engagement between the opposite ends of the upper plate and the left and right side plates gives rise to another problem in that when one end of the upper connecting plate is detached from one side plate for the maintenance or inspection of the flexible member, the upper connecting plate is allowed to turn downward about the other end being snap-fit with the other side plate, thereby hindering smooth and efficient maintenance or inspection of the flexible member.

(4) The upper connecting plate is a separate part and hence requires a special mold for producing the same in addition to a mold used for forming left and right side plates and a lower connecting plate into a unitary structure. Furthermore, a dimensional adjustment work due for achieving dimensional adjustment between the two molds adds to the cost of molds, leading to an excessively high manufacturing cost of the cable drag chain.

(5) Since the upper connecting plate is designed to be snap-fit at opposite ends with the left and right side plates to assemble a single link member, assembly of the overall cable drag chain composed of a number of such link members is laborious and time-consuming, In addition, in the cable drag chain shown in Japanese Utility Model Publication No. HEI-03-52774, the connecting plate is turned about the engagement pin of one side plate in a direction to cause the hook at the other end of the connecting plate to be snap-fit with the engagement pin of the other side plate. To this end, the hook of the upper connecting plate has a downwardly facing opening for enabling resilient deformation (consecutive radial expansion and contraction) of the hook to grip the engagement pin on the other side plate. This arrangement also causes additional problems as enumerated below.

(6) Since the upper connecting plate and the left and right side plates are connected together by the resiliency of the hooks acting on the engagement pins, the hooks are likely to be detached from the mating engagement pins when subjected to an external force or the weight of the flexible member. When such detachment occurs, the cable drag chain is no longer able to perform the prescribed receiving and protecting function with respect to the flexible member such as cable or hose.

(7) Since the opening of the hook is oriented in a direction tangent to the other end of the connecting plate, an attempt to narrow the hook opening to deal with the problem described at the preceding paragraph (6) would result in a great muscular effort required when the opposite ends of the connecting plates are engaged with the side plates. This lowers the assembling efficiency of the cable drag chain.

On the other hand, the cable drag chain shown in Japanese Patent Laid-open Publication No. HEI-10-28310 has an upper connecting plate formed integrally with one side plate and, hence, is free from a problem of missing upper connecting plate and can be manufacturing at a relatively low cost as compared to the cable drag chain shown in Japanese Utility Model Publication No. HEI-03-52774. However, the cable drag chain, due to a low rigidity of the hinge portion and a body thereof, still has problems, as enumerated below.

(1) Since the body of the cable drag chain is made so thin as to have a desired degree of bendability, and since the hinge portion is made excessively thin and hence is low in rigidity for enabling easy opening and closing of the upper connecting plate relative to the side plates, the hook at the distal end of the upper connecting plate is likely to be disengaged from the other side plate when the upper connecting plate is subjected to the weight of the flexible member, thus allowing the flexible member to project outward from the hollow internal space of the cable drag chain.

(2) In the case where the flexible member received in the cable drag chain is composed of plural flexible elements of different weights, an unbalanced load occurs. When subjected to such unbalanced load, the cable drag chain body comprised of a continuous elastic member is liable to be twisted due to insufficient rigidity. When the cable drag chain is rolled, a twist-induced force and a force or weight of the flexible member tending to tilt the side plates sideways are added together, and by thus combined forces, the connection between the upper connecting plate and one of the side plates is likely to be disengaged.

(3) In the case where plural flexible elements are stacked one above another within the hollow internal space of the cable drag chain, an upper part of the stacked flexible elements tends to force the side plates in a lateral outward direction, thereby separating the connection between the upper connecting plate and one of the side plates.

(4) When the cable drag chain is bent during use, a bent portion is subjected to a great load or force due to stoppers of the adjacent link members being held in abutment with each other. In this instance, the left and right side plates are forced to tilt outward away from each other with the result that the hook on the distal end of the upper connecting plate which is directed outward in a horizontal direction is easily disengaged from the side plate.

(5) If the rigidity of the hinge portion is excessively high, the upper connecting plate after being hooked on the side plate is forced to bend arcuately by the resiliency of the hinge portion. When the arcuately bent upper connecting portion is placed on the floor surface to support a body of the cable drag chain during use of the cable drag chain, the cable drag chain becomes unstable in position and is likely to roll down over the floor surface. On the other hand, if the bending strength of the hinge portion is made weak, the rigidity of the cable drag chain body is decreased with the result that the adjustment of the hinge strength is difficult to achieve.

(6) If the engagement strength of the hook is increased, the side plates and the upper connecting plate are susceptible to deformation or yielding due to their low rigidities. This makes-it difficult to engage the hook with a mating portion of the side plate.

(7) When the cable drag chain is in a stretched condition, slits between adjacent link members are closed. Accordingly, there is no room or space provided for allowing free access of a tool such as screwdriver to a joint portion between the upper connecting plate and the side plate when the joint is to be disengaged. In addition, the link members have no portion ready to be grasped. Thus, a joint releasing work is very difficult to achieve.

SUMMARY OF THE INVENTION

With the foregoing problems in view, it is an object of the present invention to provide a cable drag chain which can efficiently utilize the resiliency of a resinous material to make sure that an upper connecting plate can be easily assembled and is held stably in a locked position against detachment.

Another object of the present invention is to provide a cable drag chain having a connecting plate which when released, is capable of restoring a predetermined posture by its own resiliency According to the present invention, there is provided a cable drag chain comprising a plurality of link members connected together contiguously in a bendable manner. Each of the link members is molded of synthetic resin and includes a pair of opposed left and right side plates, a lower connecting plate connecting lower edges of the left and right side plates, and an upper connecting plates connecting upper edges of the left and right side plates. A resiliently deformable hinge portion is provided between an end of the upper connecting plate and one of the left and right side plates and has a flexural rigidity smaller than that of the upper connecting plate. The upper connecting plate and the one side plate are formed integrally with each other via the hinge portion. A locking portion is provided on the opposite end of the upper connecting plate and is releasably engaged with the other side plate to keep the upper connecting portion in a recumbent assembled position against the resiliency of the hinge portion.

The cable drag chain has a function to protect and guide a flexible member such as cable and hose inside a hollow interior space defined in a plurality of link members connected together end to end. The flexible member is received in the hollow interior space of the cable drag chain and the respective upper connecting plates of the link members are locked in an assembled position to close the hollow interior space in the cable drag chain. When the flexible member is to be maintained or inspected, the upper connecting plates are released from the assembled position to open the hollow interior space of the cable drag chain.

Since the upper connecting plate has one end formed integrally with the upper edge of one side plate, it is possible to reduce the equipment cost for molding die and he die adjustment cost. The link member can be readily assembled at high efficiency because the hollow interior space is closed by the upper connecting plate merely by locking the opposite end of the upper connecting plate with respect to the other side plate. In an assembled condition, at least the one end of upper connecting plate, which is formed integrally with the one side plate via the hinge portion, has a higher rigidity than a snap-fit engagement conventionally formed between one end of such upper connecting plate and one side plate. The upper connecting plate can be surely held in the assembled position even when the cable drag chain is subjected to external forces tending to twist the cable drag chain. Thus, the flexible member received in the cable drag chain is fully protected against damage. The upper connecting plate formed integrally with the side plate is free from missing.

The hinge portion has a bending rigidity smaller than that of the upper connecting plate and is resiliently deformable in an elastic region. When the upper connecting plate is forced to move from the erected leased position to the recumbent assembled position, the hinge portion resiliently deforms to permit the upper connecting plate to be assembled with the other side plate with a relatively small muscular effort. The hinge may have a plate-like configuration with a thickness smaller than the upper connecting plate and is deformable into an arcuate form when the upper connecting plate is bent or folded about the hinge portion.

When the locking portion of the upper connecting plate is released from the other side plate, the hinge portion is allowed to spring back and restore its original shape to thereby place the upper connecting plate in an erected released position in which the upper connecting plate lies in the same plane as the one side plate This arrangement ensures that the flexible member can be placed in the hollow interior space of the cable drag chain with high efficiency, and the flexible member can be maintained or inspected with utmost ease.

In one preferred form, the other side plate includes an engagement portion for interlocking engagement with the locking portion of the upper connecting plate. The engagement portion has a recess formed in the upper edge of the other side plate, and a retaining beam disposed in the recess and bridging across the recess in a longitudinal direction of the cable drag chain. The locking portion of the upper connecting plate is releasably interlocked with the retaining beam under the resiliency of the hinge portion. The resilient force of the hinge portion acts in a direction to maintain the interlocking engagement between the locking portion and the retaining beam with the result that the upper connecting plate is stably held in the recumbent assembling position even when the cable drag chain is subjected to external forces.

The retaining beam may have a sloped guide surface sloping down toward the lower connecting plate and slidably engageable with the locking portion to guide the locking portion into locking engagement with the engagement portion when the upper connecting plate is forced to move from the erected released position to the recumbent assembled position against the resiliency of the hinge portion.

It is preferable that the upper connecting plate has opposite end portions disposed adjacent to the hinge portion and the locking portion, respectively, and a central portion disposed between the opposite end portions and having a bending rigidity smaller than that of the opposite end portion. With this arrangement, when the upper connecting plate is forced to move from the erected released position to the recumbent assembled position against the resiliency of the hinge portion, the upper connecting plate resiliently flexes concentratedly at the central portion thereof. The relatively rigid opposite end portions are provided to secure reliable connection between the upper connecting plate and the side plates. The concentratedly flexible central portion assists smooth and efficient connection between the locking portion of the upper connecting plate and the other side plate. The central portion of the upper connecting plate may have a thickness smaller than that of the opposite end portions, or a width smaller than that of the opposite end portions.

BRIEF DESCRIPTION OF THE DRAWINGS

A certain preferred embodiment of the present invention will now be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
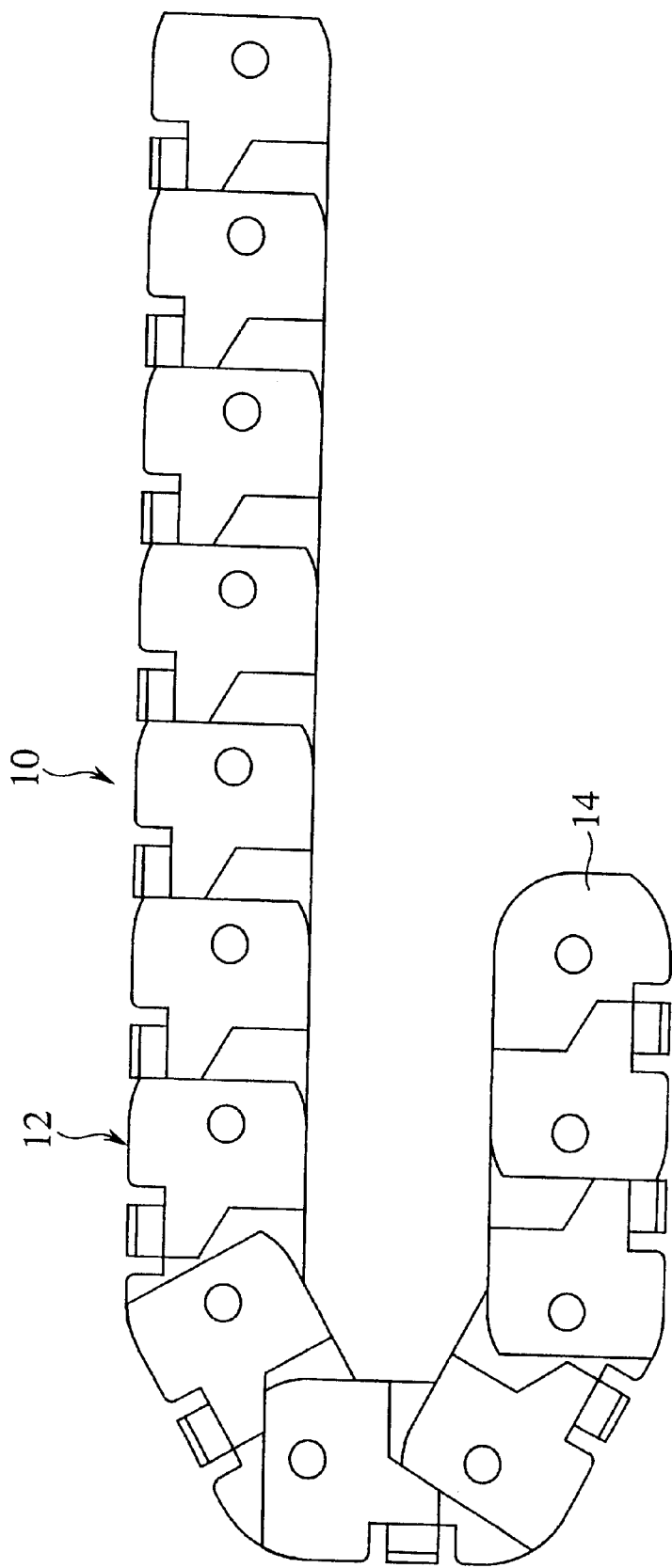
FIG. 1 is a side view of a cable drag chain embodying the present invention.

Referring now to the drawings and FIG. 1 in particular, there is shown in side view a cable drag chain 10 embodying the present invention. The cable drag chain 10 includes a plurality of link members 12 connected together end to end in a bendable manner. One end of the cable drag chain is attached to a movable machine (not shown) and the other end of the cable drag chain 10 is attached to a floor surface (not shown). To this end, the opposite ends of the cable drag chain 10 are equipped with metal fittings 14 (one being designated).

Figure 2:
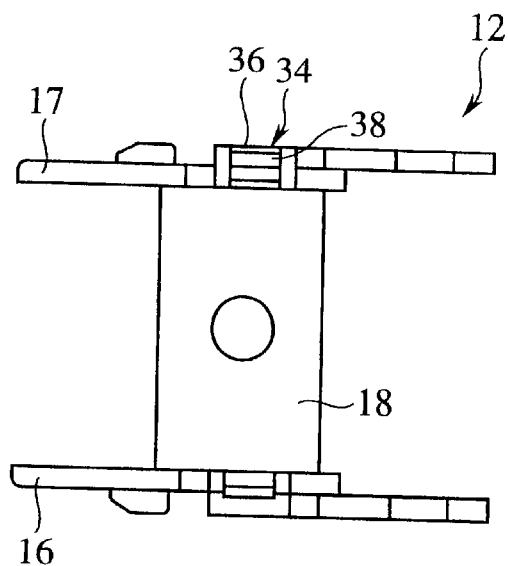
FIG. 2 is a top plan view of a link member of the cable drag chain.
Figure 3:
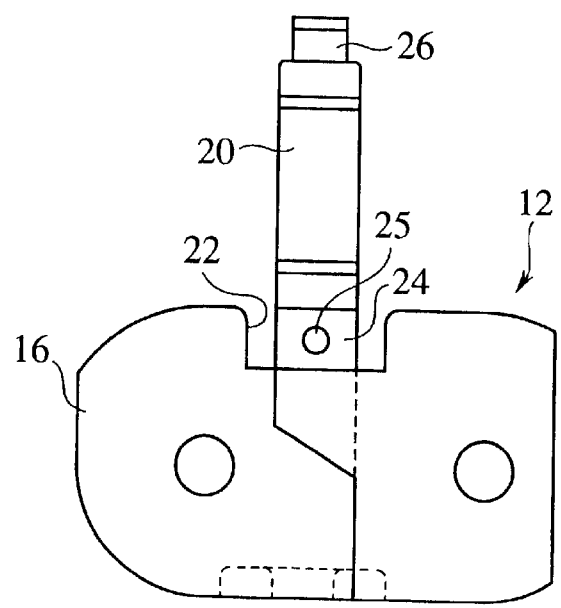
FIG. 3 is a side view of the link member with an upper connecting plate shown in its free state.
Figure 4:
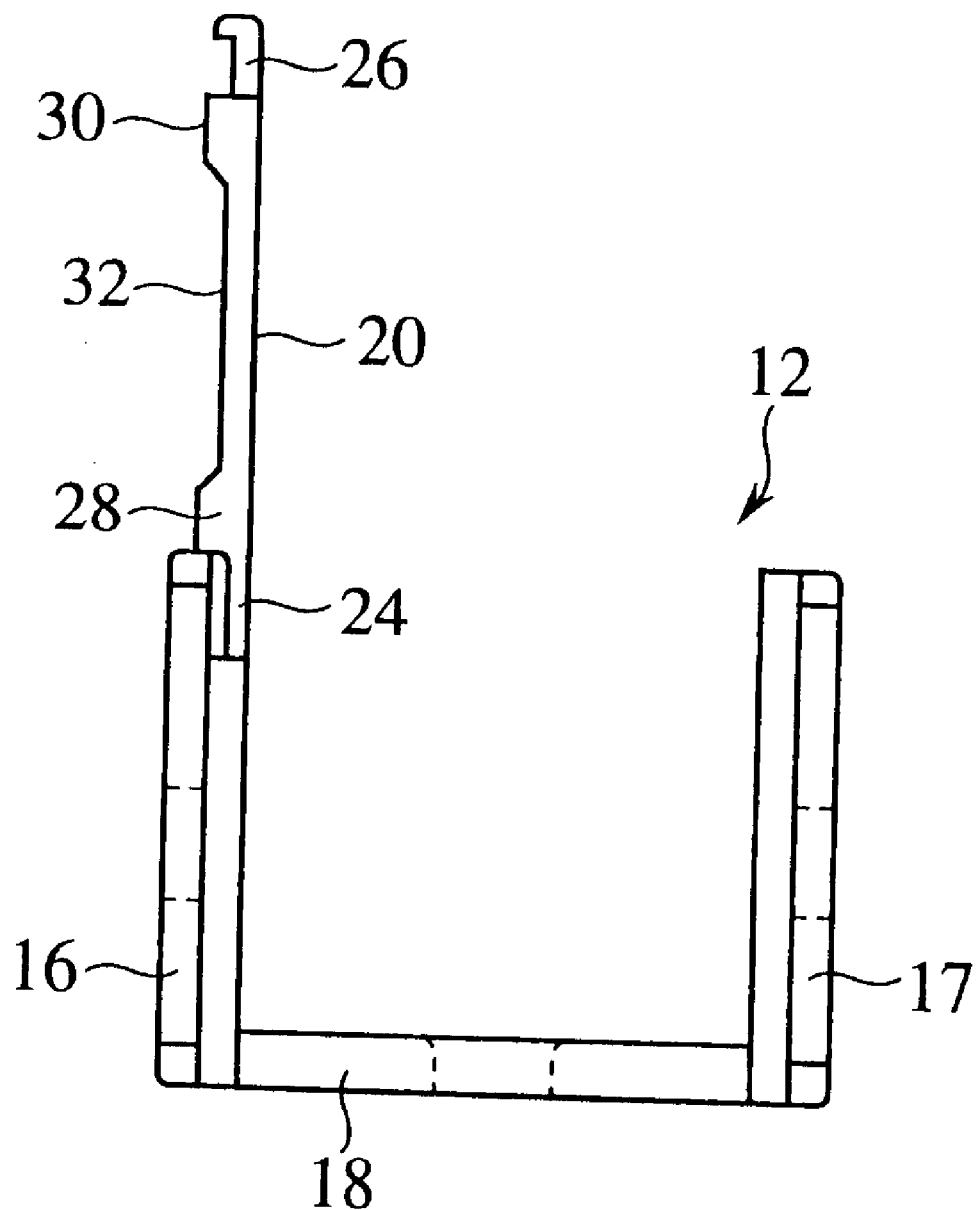
FIG. 4 is a front elevational view of FIG. 3.

As shown in FIGS. 2 through 4 inclusive, each link member 12 has, in its molded condition, a pair of left and right side plates 16 and 17, a lower connecting plate 18 connecting lower edges of the side plates 16, 17, and an upper connecting plate 20 for connecting upper edges of the side plates 16, 17. The link member 12 is injection-molded from a synthetic resin. The lower connecting plate 18 is formed integrally with the side plates 16, 17 at opposite ends thereof. The upper connecting plate 20 has one end formed integrally with one side plate 16.

Since the upper connecting plate 20 formed integrally with the side plate 16 does not require a separate molding die for producing the same, the overall molding cost including die cost and die adjustment cost can be reduced. In addition, by virtue of integral formation of the upper connecting plate 20 and the side plate 16, assembling cost of the link member 12 can be reduced, and the yielding of molding material used for forming unusable runners and sprue can be reduced. Furthermore, the upper connecting plate 20 is completely free from missing during assembly of the link member and maintenance or inspection of a flexible member such as cable or hose received in the cable drag chain 10.

With the upper connecting plate 20 thus molded integrally with the side plate 16 at one end thereof, the link member 12 and the cable drag chain 10 is made highly rigid against external forces tending to twist or otherwise deform the link member 12 and the cable drag chain 10.

The side plate 16 has a rectangular cutout portion 22 formed in a longitudinal central portion of the side plate 16 across the thickness thereof. A plate-like hinge portion 24 extends perpendicularly from a bottom surface of the rectangular cutout portion 22 and lies in the same plane as the side plate 16. The hinge portion 24 is contiguous only with the bottom surface of the cutout portion 22. Further, the hinge portion 24 has an inside surface extending flush with an inside surface of the side plate 16.

Figure 5:
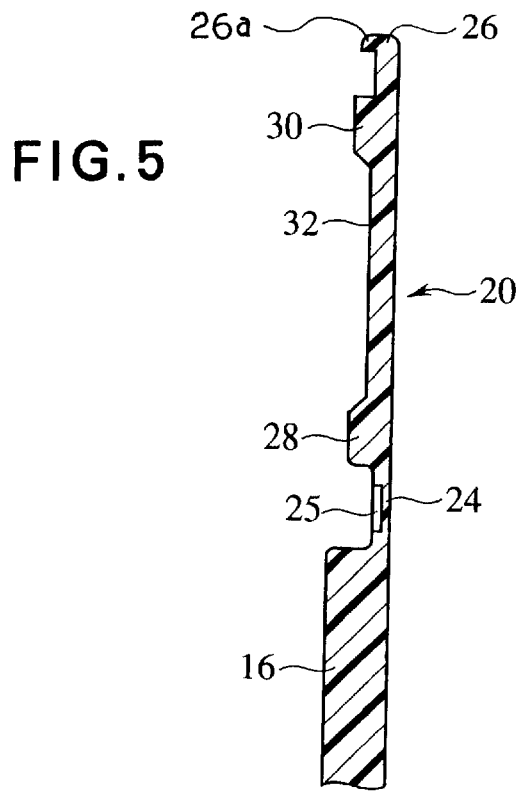
FIG. 5 is an enlarged cross-sectional view of a part of FIG. 4 showing an upper connecting plate and a hinge portion between the upper connecting plate and one side plate.

As detailed in FIGS. 3 and 5, one end of the upper connecting plate 20 is made contiguous with the side plate 16 via the hinge portion 24. The hinge portion 24 has a given length and is rounded at opposite corner edges formed between the hinge portion 24 and the side plate 16 and between the hinge portion 24 and the upper connecting plate 20. The hinge portion 24 has a circular recess 25 formed in a central portion of an outside surface of the hinge portion 24. By thus formed recess 25, the hinge portion 24 has a reduced cross-sectional area at the recessed central portion thereof and tends to be folded or bent itself about the recessed central portion. Thus, the upper connecting plate 20 can surely be bent abut the recessed central portion of the hinge portion 24. In addition, due to its reduced cross-sectional area, a stress acting across the recessed central hinge portion 25 can be decreased with the result that the hinge portion 24 is readily deformable within an elastic region of the molded synthetic resin material. Furthermore, since the recess 25 does not penetrate the hinge portion 25, the molding material can smoothly flow through the recess 25 without forming a break-inducing weld line on a downstream side of the recess 25. The recess 25 is so designed as to prevent undue reduction of the cross-sectional area of the hinge portion 24 and retain a desired degree of rigidity of the hinge portion 24. The circular recess 25 may be replaced by an elliptical recess or a rectangular recess.

The connecting plate 20 has a distal or free end formed with a locking portion 26. An intermediate portion of the connecting plate 20 extending between the hinge portion 24 and the locking portion 26 comprises a rectangular web adapted to extend crosswise between the left and right side plates 16, 17, we will be described later In the illustrated embodiment, the connecting plate 20 has the same width as the hinge portion 24 when viewed from the longitudinal direction of the cable drag chain 10 (FIG. 1).

In order to facilitate the assembly and improve the strength, the upper connecting plate 20 has a non-uniform thickness. More specifically, the upper connecting plate 20 has thickened opposite end portions 30, 30 adjacent the hinge portion 24 and the locking portion 26, and a thin central portion 32 extending between the thickened end portions 28, 30 The central portion 32 has a thickness larger than that of the hinge portion 24, Since the connecting upper plate 20 and the hinge portion 24 have the same width, the bending rigidity becomes greater in the order of the hinge portion 24, thin central portion 32 of the upper connecting plate 20, and thickened end portions 28, 30 of the upper connecting plate 20

Figure 6:
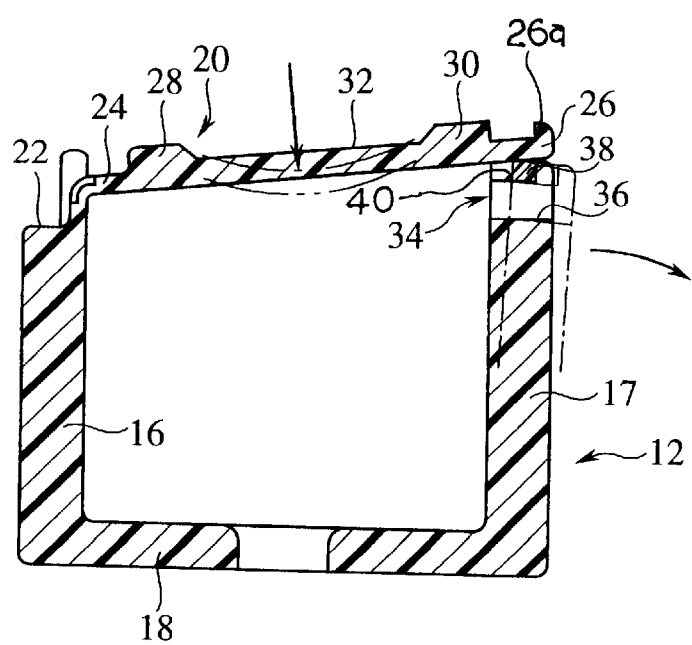
FIG. 6 is a cross-sectional view showing the manner in which the link member is assembled.

As shown in FIG. 6, when the upper connecting plate 20 is to be joined with the side plate 17, the upper connecting plate 20 is folded or bent about the hinge portion 24 down toward the side plate 17. In this instance, since the hinge portion 24 is lower in the bending rigidity than the parts 23, 30, 32 of the upper connecting plate 20, the upper connecting plate 20 can retain its unbent or rectilinear configuration as it is folded down from the erected released position shown in FIGS. 4 and 5. The width and thickness of the hinge portion 24 are determined in view of the maximum tensile stress and the maximum compressive stress of a synthetic resin material used so that the hinge portion 24 is deformable in the elastic region and does never form a plastic hinge when bent.

Figure 8:
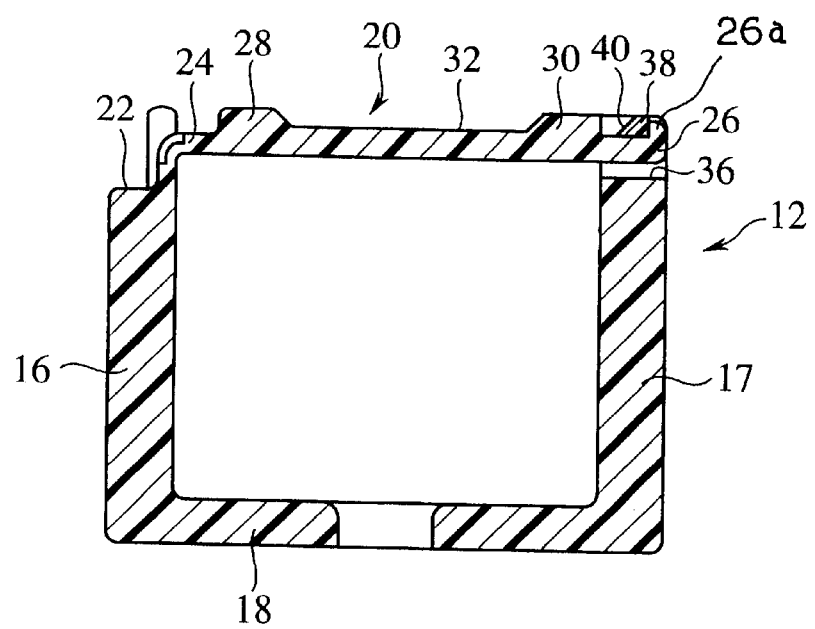
FIG. 8 is a cross-sectional view showing an assembled link member.

The side plate 17 has an engagement portion 24 formed at a central portion of the upper edge thereof for interlocking engagement with the locking portion 26 of the upper connecting plate 20 to keep the upper connecting plate 20 in its recumbent assembled position shown in FIG. 8.

When the upper connecting plate 20 is bent about the hinge portion 24 toward the side plate 17, the locking portion 26 of the upper connecting plate 20 comes into abutment with an upper surface of the engagement portion 24 of the side plate 17, as shown in FIG. 6. In this instance, the hinge portion 24 is resiliently deformed or bent at an angle of about 90 degrees. As the upper connecting plate 20 is further forced downward, the thin central portion 32 of the upper connecting plate 20 yields to resiliently flex or distort downward in a downwardly projecting arcuate form, as indicated by the phantom lines shown in FIG. 6.

The engagement portion 34 of the side plate 19 has a rectangular opening or recess 36 extending across the thickness of the side plate 17 in the same manner as the cutout portion 22 of the side plate 16, and a retaining beam 38 disposed in and bridging across the recess 36 in the longitudinal direction of the cable drag chain 38. The retaining beam 38 is located at a central portion of the width of the side plate 17 and offset inwardly prom both inside and outside surfaces of the side plate 17. The retaining beam 38 has a sloped guide surface 40 (FIGS. 7 and 8) sloping down toward the interior of the link member 12. The locking portion 26 of the upper connecting plate 20 is smaller in width than the thickened end portion 30, and the recess 36 and the locking portion 26 are mutually engageable with each other. The locking portion 26 has an upwardly projecting locking prong 26a formed at the tip end thereof.

When the upper connecting plate 20 is forced downward to such an extent that the thin central portion 32 is caused to flex downward into the phantom-lined arcuately distorted position shown in FIG. 6, a downward force or pressure is applied from the locking portion 26 of the upper connecting plate 20 to the sloped surface 40, thereby causing the side plate 17 to tilt outwardly away from the side plate 16, as indicated by the phantom line shown in FIG. 6. In this instance, due to the central portion 32 being bent arcuately, the upper connecting plate 20 has a smaller effective length than as it is in the unbent free state.

Figure 7:
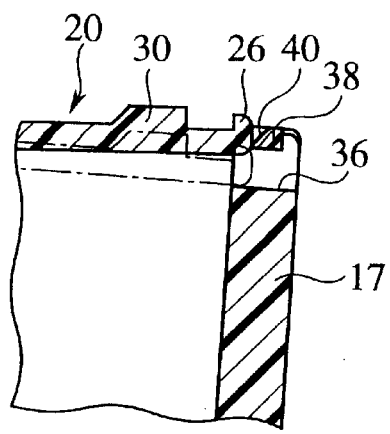
FIG. 7 is a cross-sectional view of a part of FIG. 6 showing an engagement portion of the link member.

By further forcing the upper connecting plate 20 downward, downward flexing of the thin central portion 32 becomes greater and eventually causing the locking portion 26 to slide down from the sloped guide plate 40 onto a bottom surface of the recess 36, as indicated by the phanrtom lines shown in FIG. 7. substantially at the same time, the upper connecting plate 20 is allowed to restore its original unbent rectilinear configuration, and the side plate 17 is allowed to spring back into its original upright position. With this movement, the locking portion 26 is brought to a position beneath the retaining beam 38. Then, the upper connecting plate 20 is moved upward by the resiliency of the hinge portion 24 whereby the locking prong 26a of the locking portion 26 is interlocked with the retaining beam 38 of the side plate 17, as shown in FIG. Thus, a link member 12 can be assembled merely by depressing the upper connecting plate 20 against the side plate 17.

Since in the assembled condition shown in FIG. 8, the locking prong 26a of the locking portion 26 is urged by the resiliency of the hinge portion 24 in a direction to keep the interlocking engagement between itself and the retaining beam 38 of the side plate 17, the upper connecting plate 20 can be surely held in the recumbent assembled position against detachment from the side plate 17. During the use of the cable drag chain 10 (FIG. 1), the side plates 16, 17 are normally subjected to external forces tending to tilt the side plates 16, 17 inwardly toward each other. It is, therefore, almost unlikely that the upper connecting plate 20 is detached from the side plate 17 during the use of the cable drag chain 10. Furthermore, since the thickened end portion 30 of the upper connecting plate 20 is in abutment with the inside surface of the side plate 17, tilting of the side plates 16, 17 in both inward and outward directions can be prohibited.

When the flexible member such as cable or hose received inside the cable drag chain 10 is to be maintained or inspected, the locking portion 26 of the upper connecting plate 20 is disengaged from the engagement portion 34 of the side plate 17, whereupon the hinge portion 24 is allowed Lo spring back and restore its original flat plate-like configuration shown in FIG. 5. Thus, the upper connecting plate 20 now assumes at its elected unbent released position shown in the same figure.

As shown in FIGS. 2 to 4, the hinge portion 24 and the upper connecting plate 20 are initially formed as an integral extension of the side plate 16 lying in substantially the same plane as the side plate 16. This arrangement facilitates mold opening and thus increase the production efficiency when individual link members 12 are formed by injection molding. In addition, since the upper connecting plate 20, hinge portion 24 and side plate 16 are aligned with each other, they can be easily formed by injection molding without using a complicated molding die or a movable mold. The respective inside surfaces of the upper connecting plate 20 and side plate 16 may add to cost reduction of the molding die.

It is known that in the injection molding process, the strength of a molded article is influenced by the position of a gate provided for the passage therethrough of a molten synthetic resin material. Though not shown, according to the present invention, a gate is connected to a portion of a mold cavity provided for forming the lower connecting portion 18 of the link member 12. With the gate thus arranged, a molten synthetic resin material, as it is injected into the mold cavity through the gate, first flows into a first mold cavity portion corresponding to the lower connecting plate 18, then moves downstream into a pair of second cavity portions corresponding to the left and right side plates 16, 17, and further advances from one of the second mold cavity portions corresponding to the left side plate 16 into consecutive forth and fifth mold cavity portions corresponding to the hinge portion 24 and the upper connecting plate 20. With this flow of the molten synthetic resin material, the synthetic resin material in the hinge portion 24 is oriented in a direction orthogonal to the bending direction of the upper connecting plate 20. The thus oriented hinge portion 24 is strong enough to withstand external forces including a twist applied to the cable drag chain 10 while in use. Further, since the respective inside surfaces of the side plate 16, hinge portion 24 and upper connecting plate 20 extend flush with one another, the molten synthetic resin material can flow smoothly throughout the mold cavity, thereby preventing short shot caused due to insufficient charging of the molten synthetic resin material.

As described above, since each link member of the cable drag chain is molded of synthetic resin with an upper connecting plate formed integrally with one side plate at one end thereof via a hinge portion, the molding cost including molding die cost and die adjustment cost can be reduced. The hinge portion formed integrally with the upper connecting plate and the one side plate is resiliently deformable without causing reduction in the rigidity even when the upper connecting plate is frequently bent or folded about the hinge portion.

When a Locking portion provided at the other end of the upper connecting plate is released from the other side plate, the hinge portion is allowed to spring back and restore its original shape whereby the upper connecting plate is brought to an erected released position in which the upper connecting plate lies in the same plane as the one side plate. This arrangement enables easy and highly efficient installation of a flexible member such as cable or hose into the cable drag chain as well as easy and highly efficient maintenance and inspection of the flexible member received inside the cable drag chain.

The locking portion of the upper connecting plate is releasably engaged with an engagement portion of the other side plate. The engagement portion has a recess formed in the upper edge of the other side plate and a retaining beam disposed in and bridging across the recess in a longitudinal direction of the cable drag chain. The locking portion of the upper connecting plate is interlocked with the retaining beam under the resiliency of the hinge portion. Since the resilient force of the hinge portion acts in a direction to keep the interlocking engagement between the locking portion and the retaining beam, the upper connecting plate is surely held in the assembled position against detachment from the other side plate.

The upper connecting plate has a central portion concentratedly bendable due to its bending rigidity smaller than that of opposite end portions of the connecting plate When the upper connecting plate is folded about the hinge portion and forced against the other side plate, the central portion resiliently flex or distort in a downwardly arcuate configuration, thereby allowing the locking portion to move into interlocking engagement with the retaining beam Obviously, various minor changes and modifications of the present invention are possible in the light of the above teaching. It is therefore to be understood that within the scope of the appended claims, the present invention may be practiced otherwise than as specifically described.

What is claimed is:

1. A cable drag chain comprising:
   a plurality of link members connected together contiguously in a bendable manner;
   each of the link members being molded of synthetic resin and including a pair of opposed left and right side plates, a lower connecting plate connecting lower edges of the left and right side plates, and an upper connecting plates connecting upper edges of the left and right side plates;
   a resiliently deformable hinge portion being provided between an end of the upper connecting plate and one of the left and right side plates and having a flexural rigidity smaller than that of the upper connecting plate;
   the upper connecting plate and the one side plate being formed integrally with each other via the hinge portion;
   the other side plate including an engagement portion for interlocking engagement with the opposite end of the upper connecting plate, the engagement portion having a recess formed in the upper edge of the other side plate and a retaining beam disposed in the recess and bridging across the recess in a longitudinal direction of the cable drag chain; and
   a locking portion being provided on the opposite end of the upper connecting plate and being releasably engaged in the recess of the other side plate below the retaining beam to keep the upper connecting portion in a recumbent assembled position against the resiliency of the hinge portion, said locking portion having an upwardly-projecting locking prong formed at the tip end thereof to releasably interlock with the retaining beam.

2. A cable drag chain according to claim 1, wherein when the locking portion of the upper connecting plate is released from the other side plate, the hinge portion is allowed to spring back and restore its original shape to thereby place the upper connecting plate in an erected released position in which the upper connecting plate lies in the same plane as the one side plate.

3. A cable drag chain according to claim 2, wherein the retaining beam has a sloped guide surface sloping down toward the lower connecting plate and slidably engageable with the locking prong of the locking portion to guide the locking portion into locking engagement with the engagement portion when the upper connecting plate is forced to move from the erected released position to the recumbent assembled position against the resiliency of the hinge portion.

4. A cable drag chain according to claim 3, wherein the upper connecting plate has opposite end portions disposed adjacent to the hinge portion and the locking portion, respectively, and a central portion disposed between the opposite end portions, the central portion has a bending rigidity smaller than that of the opposite end portions so that when the upper connecting plate is forced to move from the erected released position to the recumbent assembled position against the resiliency of the hinge portion, the upper connecting plate resiliently flexes concentratedly at the central portion thereof.

5. A cable drag chain according to claim 4, wherein the central portion of the upper connecting plate has a thickness smaller than that of the opposite end portions.

6. A cable drag chain according to claim 2, wherein the upper connecting plate has opposite end portions disposed adjacent to the hinge portion and the locking portion, respectively, and a central portion disposed between the opposite end portions, the central portion has a bending rigidity smaller than that of the opposite end portions so that when the upper connecting plate is forced to move from the erected released position to the recumbent assembled position against the resiliency of the hinge portion, the upper connecting plate resiliently flexes concentratedly at the central portion thereof.

7. A cable drag chain according to claim 6, wherein the central portion of the upper connecting plate has a thickness smaller than that of the opposite end portions.

* * * * *

UNITED STATES PATENT AND TRADEMARK OFFICE
CERTIFICATE OF CORRECTION

PATENT NO. : 6,318,063 B1
DATED : November 20, 2001
INVENTOR(S) : Komiya et al.

It is certified that error appears in the above-identified patent and that said Letters Patent is hereby corrected as shown below:

Column 7,
Line 47, "parts 23" should be -- parts 28 --;

Column 8,
Line 45, after "in FIG." insert -- 8 --;

Column 9,
Line 4, change "Lo" to -- to --.

Signed and Sealed this

Twelfth Day of November, 2002

*Attest:*

JAMES E. ROGAN
*Attesting Officer*    *Director of the United States Patent and Trademark Office*